Figure 1:
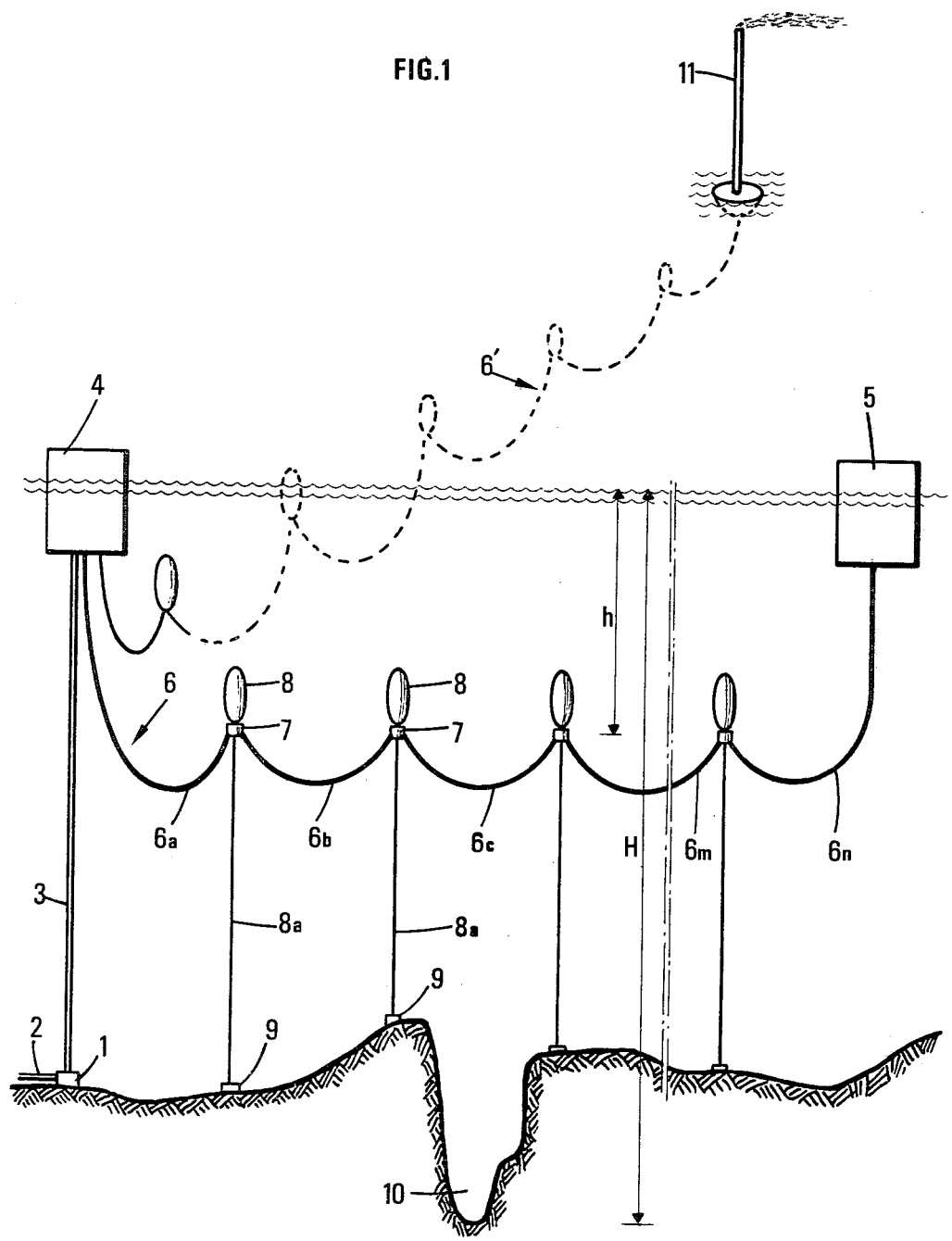

United States Patent [19]

Joubert et al.

[11] 4,263,004
[45] Apr. 21, 1981

[54] DEVICE FOR TRANSFERRING A FLUID THROUGH A LIQUID BODY BY MEANS OF A FLEXIBLE PIPE

[75] Inventors: Philippe Joubert, Les Loges en Josas; Michel Loupias, Clamart; Pierre Durando, Paris, all of France

[73] Assignee: Institut Francais du Petrole, Rueil-Malmaison, France

[21] Appl. No.: 891,628

[22] Filed: Mar. 30, 1978

[30] Foreign Application Priority Data

Apr. 4, 1977 [FR] France .................................. 77 10345

[51] Int. Cl.³ .............................................. F16L 1/00
[52] U.S. Cl. ..................................... 405/172; 405/171
[58] Field of Search ................. 61/112, 107, 110, 111, 61/113; 137/236; 405/171, 172, 158, 168

[56] References Cited

U.S. PATENT DOCUMENTS

| 2,648,201 | 8/1953 | Marancik et al. | 137/236 X |
| 3,021,864 | 2/1962 | Young | 61/112 X |
| 3,173,271 | 3/1965 | Wittgenstein | 61/112 |
| 3,273,346 | 9/1966 | Delaruelle et al. | 405/171 X |
| 3,620,028 | 11/1971 | Wilde | 405/172 |
| 4,075,862 | 2/1978 | Ames | 405/171 |

Primary Examiner—Dennis L. Taylor
Attorney, Agent, or Firm—Craig & Antonelli

[57] ABSTRACT

This device comprises a pipe formed of separate flexible pipe sections which in use are supported by buoyant elements maintained immersed by anchoring means. The flexible pipe sections are interconnected by couplings with at least some of these couplings being connected to a buoyant element and comprising stress limiters applied to the pipe sections adjacent said couplings.

11 Claims, 8 Drawing Figures

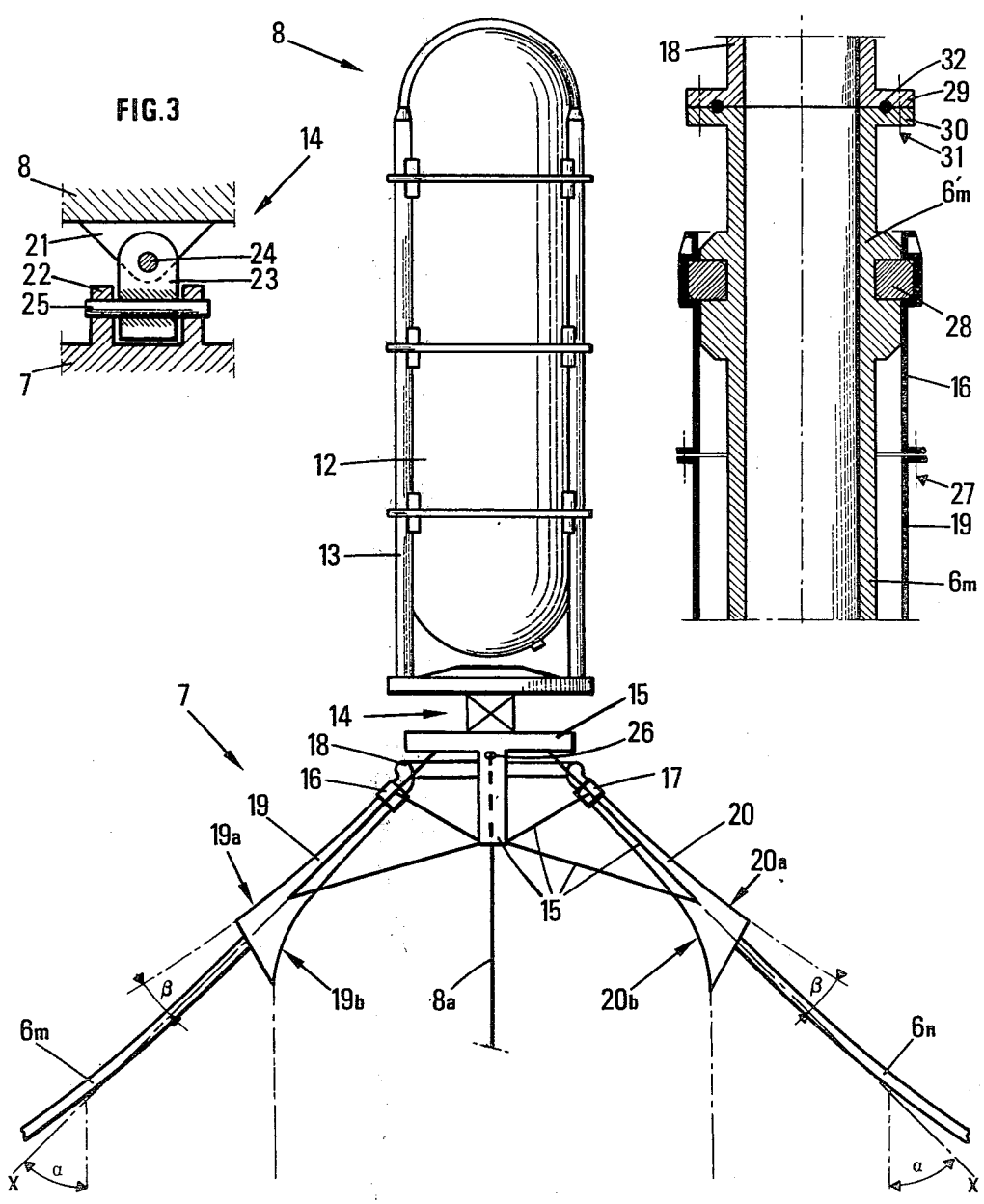

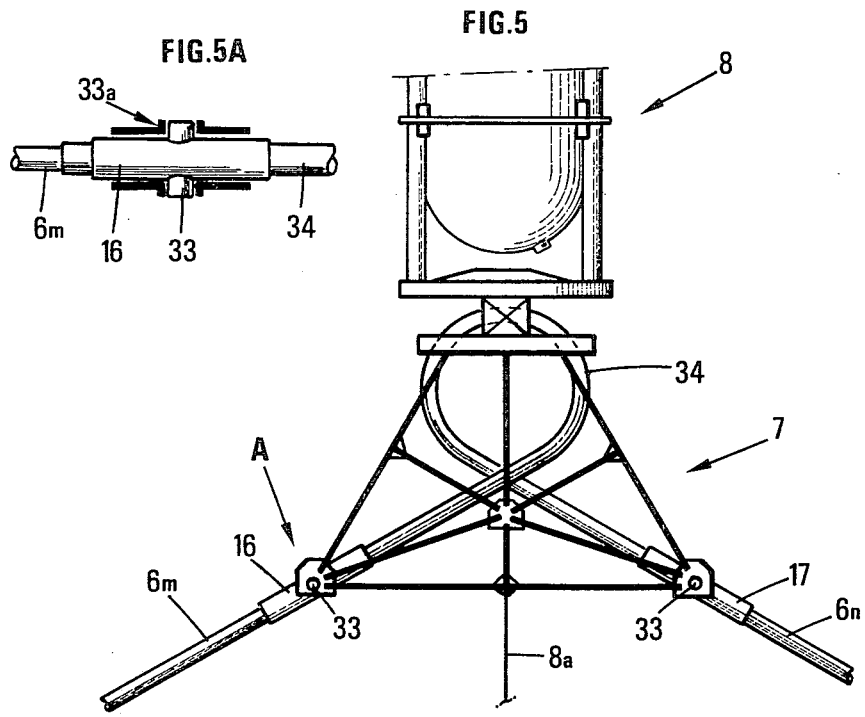
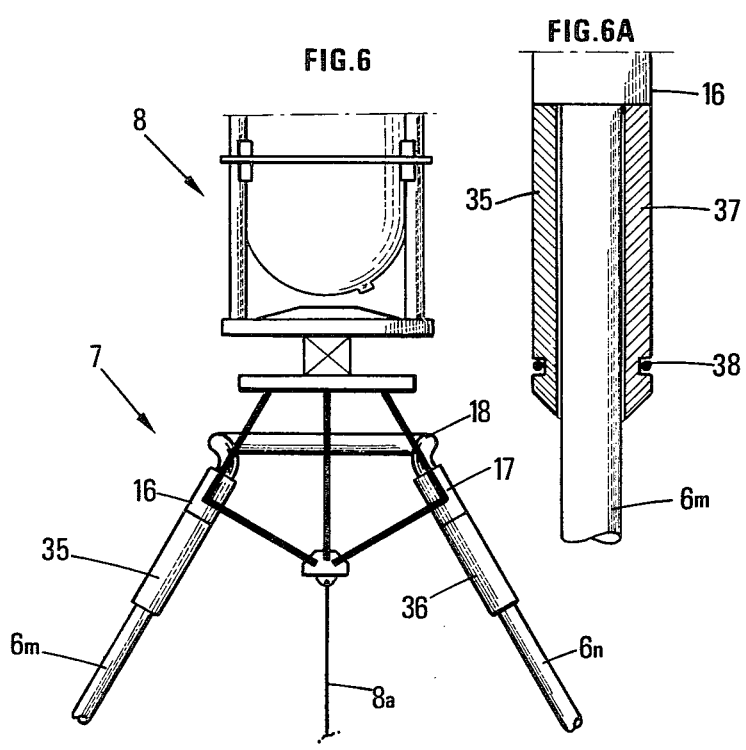

DEVICE FOR TRANSFERRING A FLUID THROUGH A LIQUID BODY BY MEANS OF A FLEXIBLE PIPE

The present invention relates to a device for transferring a fluid through a liquid body by means of a flexible pipe.

In particular, but not exclusively, the device according to the invention is suitable for transferring oil products between a first floating installation (such as a floating tank, a terminal for unloading oil tankers, a floating platform, etc.) or a first underwater installation (tank resting on the sea bottom, manifold of an underwater oil field, etc.) and a second installation which may be located either at the water surface (terminal for unloading oil tankers, etc.), or onshore (pipeline terminal etc.).

At the present time when offshore installations are located in shallow waters, there are used most of time rigid pipes laying on the water bottom or held in the vicinity thereof through rigid support members which rest on the water bottom.

With increasing ocean depth pipe laying onto the water bottom becomes more and more difficult under normal safety conditions for the equipment. The following points should be moreover noted:

unevennesses of the sea bottom, which are not always well known, increase the difficulties of pipe laying, and the more as such depth variations become more substantial and sudden, since they generate in the pipe stresses liable to distroy it, the presence of very deep dea abysses makes pipe laying impossible in some cases, and the wall thickness of the pipe must be sufficient to withstand the hydrostatic pressure at the greatest depth reached by the pipe, which increases the stiffness of this pipe and consequently increases the difficulties of pipe laying.

To obviate these drawbacks it has been already proposed to maintain the transfer pipes at a determined immersion depth by using either floating pipes which are locally weighted and anchored or, alternatively, pipes of negative buoyancy supported by anchored buoyant elements.

To prevent variable external forces, due, for example, to sea currents, from too much modifying the outline of the whole pipe, and thereby locally inducing in this pipe variable stresses of high values capable of damaging the pipe, there is used, according to the prior art, complex and expensive anchoring means, comprising, for example, a plurality of anchoring lines for each float and requiring time-consuming and difficult operations to be put into service.

The object of the present invention is to provide a fluid transferring device comprising a pipe immersed at a depth which depends on the type of utilization and which does not suffer for the above-mentioned drawbacks.

The invention will be understood and its advantages made apparent from the following description, illustrated by the accompanying drawings wherein:

FIG. 1 diagrammatically illustrates a particular, non limitative embodiment of fluid transfer pipe according to the invention, FIG. 2 shows more in detail a coupling element supported by a buoyant member, FIG. 3 shows a hinged connecting element, FIG. 4 shows an embodiment of the connectors, and FIGS. 5 to 6A illustrate further embodiments of the invention.

FIG. 1 illustrates, by way of example, an embodiment of the invention used for transferring, between two marine installations, oil from a producing underwater oil field located at a great depth.

Reference 1 designates an oil manifold resting on the water bottom and connected through a flow line, such as pipe 2, to the different (not shown) underwater producing well heads.

A vertical pipe or riser 3 connects manifold 1 to a diagrammatically illustrated floating installation 4 held in position by anchoring means (not shown).

Riser 3 may be a rigid pipe. Alternatively, it may be a flexible pipe of a type comprising a tight and oil-resistant flexible tubular element and reinforcing armourings adapted to withstand the pressure difference between the inside and outside of the pipe, and traction stresses applied to this pipe.

The floating installation 4 may comprise means for protecting riser 3 against the action of the alternative vertical movements of the floating installation 4. These last means, forming no part of this invention, need not to be further described here.

In the embodiment of FIG. 1, the floating installation 4 is equipped with a device for treating crude oil flowing from manifold 1, such as a degassing device (not shown).

After this treatment, oil is stored in a second marine installation, such as a floating tank 5 anchored at some distance from installation 4 by mooring cables (not shown).

Fluid transfer between marine installations 4 and 5 is achieved in the device according to the invention through a flexible pipe 6 which is kept immersed by any suitable means, each end of the flexible pipe 6 being connected to one of the floating installations 4 and 5.

According to the invention, flexible pipe 6 comprises separate sections $6a$, $6b$, $6c$ ... $6m$, $6n$, interconnected by coupling members 7 supported by buoyant elements 8 having an overall buoyancy greater than the apparent weight of flexible pipe 6 in water.

Each buoyant element 8 is secured to an anchoring cable $8a$ connected to a stationary element 9, such as an anchoring point or a mooring mass on the water bottom. The length of these anchoring cables $8a$ is adjusted to the value required to maintain flexible pipe 6 at the desired immersion depth.

This immersion depth is preferably so selected as to avoid any disturbance to sea navigation and also to nullify the wave action or at least to reduce it to an acceptable value. This immersion depth will of course be selected in dependence with the site of installation of the pipe, so that for instance this pipe is not subjected to the action of sea currents, if any. Moreover, this immersion depth may differ for two different pipe sections, for example, but not exclusively, with a view to protect the pipe against the action of an underwater current, etc.

It can be generally assumed that the immersion depth of buoyant elements 8 with respect to the sea level must be at least 50 meters and preferably from 50 to 150 meters.

The following advantages will then appear to those skilled in the art;

laying such a pipe line is simpler and can be effected from any floating supporting structure, pipe 6 is subjected over its whole length to a hydrostatic pressure substantially lower than in the case of a pipe laid on the sea floor, FIG. 1 shows that pipe laying is not affected by the profile of the sea bottom even if, in the area where the pipe is laid, there exist abysses of great depths H, as diagrammatically shown at 10 in FIG. 1, watching and maintainance operations can be performed by direct intervention of divers, and it is possible to rise back to the water surface pipe 6 or the pipe section located between two floats 7, for watching, maintaining or recovering this pipe section.

FIG. 1 shows a second pipe 6' conveying gas to a floating flare 11 constituting also a floating marine installation.

FIG. 2 shows more in detail a first embodiment of means 7 for connecting two successive flexible pipe sections 6m and 6n, these means being supported by a buoyant element 8.

Buoyant element 8 comprises a tight chamber 12 of determined volume, so designed as to withstand the hydrostatic pressure at the immersion depth h of the buoyant element. This tight chamber 12 may be, in conditions of use, filled with a pressurized gas to reduce the pressure difference between the inside and outside of this chamber. Optionally chamber 12 will be provided with separating walls delimiting inside this chamber compartments at least some of which optionally contain a variable volume of liquid, to permit adjustment of the buoyancy of elements 8, for example, when the latter are put into operation. Means for introducing and/or discharging liquid may be provided and comprise elements such as hydraulically actuated flap valves. Realization of such elements will be easy to those skilled in the art and therefore needs not to be described in detail.

In the embodiment illustrated by FIG. 2, the tight chamber 12 is surrounded by a reinforcing frame 13.

Under buoyant element 8 is suspended, through a connecting means 14, a coupling means 7 for two successive flexible pipe sections, such as sections 6m and 6n.

This coupling means 7 comprises a frame or support member consisting of an assembly of rods or tubes 15, integral with connecting member 14. This frame supports connectors 16 and 17 to which the ends of flexible pipe sections 6m and 6n respectively can be tightly connected. Connectors 16 and 17 are interconnected through a connecting pipe 18 which may be either a rigid or a flexible pipe.

On their sides opposite to pipe 18, connectors 16 and 17 are provided with means adapted to locally withstand the bending stresses applied to the flexible pipe sections or at least to prevent any detrimental action thereon.

In the embodiment illustrated by FIG. 2 these means consist of hawsers 19 and 29.

Such hawsers 19, 20 are so arranged that their axes X form with a vertical line angles $\alpha$ whose value is determined as a function of the distance between two successive buoyant elements 8 of the length of the flexible pipe section connecting these two buoyant elements 8 and of the mechanical characteristics of this pipe section (e.g. its stiffness), so that the axes of the hawsers 19, 20 are substantially tangent to the average outline of pipe sections 6m and 6n in the vicinity of the connectors 16 and 17 which are coaxial with these hawsers 19, 20.

The inner profile of these hawsers 19, 20 is so designed as to prevent variations in the relative position of two successive buoyant elements 8 which would result in an excessive reduction in the radius of curvature of the flexible pipe sections adjacent to the connectors secured thereto, the pipe being then supported by the inner wall of the hawser. The latter has at any point a radius of curvature at least equal to the minimum radius of curvature which the flexible pip section can withstand without damage.

Thus the generatrices 19a or 20a of hawsers 19 or 20 formed by the intersection of the inner wall of each of these hawsers (in their position of use) with a vertical plane passing through the hawser axis have such a profile that the angle between a vertical line and the tangent to this profile varies continuously with an increasing distance from connectors 16 and 17 from the above-defined value $\alpha$ to a value $(\alpha+\beta)$ selected by those skilled in the art in dependence with the maximum variations in the relative positions of the successive buoyant elements 8. Similarly, the generatrices 19b and 20b opposite to generatrices 19a and 20a, respectively, have such a profile that the angle between a vertical line and the tangent to this profile varies continuously with an increasing distance from connectors 16 and 17, from the above-defined value $\alpha$ to a value substantially equal to zero.

When under the action of an external influence (a sea current, for example) the distance between two buoyant elements 8 is substantially increased, the flexible pipe section connecting these two elements 8 bears against a greater or lesser portion of an upper generatrix such as 20a of the hawser. Conversely, when two buoyant elements 8 are moved towards each other this results in a deformation of the flexible pipe which then bears along a greater or lesser portion of a lower generatrix such as 20b.

The element 14 connecting coupling means 7 to buoyant element 8 may be of any type providing for a rigid connection, such as by bolting, welding etc. but a hinged connection will be preferably used.

FIG. 3 represents a particular embodiment of the connection element which comprises a yoke 21 secured to element 8, a yoke 22 secured to element 7 and an intermediate element 23 rotatable about two distinct shafts 24 and 25 at right angles to each other and secured to yokes 21 and 22 respectively. The assembly constitutes a universal joint coupling.

The upper end of anchoring cable 8a is hingedly connected to a point 26 of coupling element 7, this point being located as close as possible to the connecting means, particularly when the latter is a hinged element.

FIG. 4 is a cross sectional view of an embodiment of connector 16, formed of a tubular element wherein can be positioned the rigid coupling 6'm at the end of flexible pipe 6m. On the side of pipe 6m, the connector is extended by hawser 19 secured by screws or bolts, diagrammatically shown at 27. Connection of rigid coupling 6'm and connector 16 is achieved by two pins 28 which are engaged in two complementary slots provided in connector 16 and rigid coupling 6'm. Pipe 18 is secured to the end of the coupling 6'm by any suitable tight connecting device. For example pipe 18 and coupling 6'm are provided with complementary flanges 29 and 30 assembled by bolts 31, sealing being achieved by a washer 32.

FIGS. 5, 5A, 6 and 6A illustrate further embodiments of the invention.

In the embodiment illustrated by FIG. 5, connectors 16 and 17 are articulated on elements 7, for example by means of a shaft 33 which, as shown by FIG. 5A, cooperates with a bearing 33a carried by element 7. Moreover, connectors 16 and 17 are interconnected by a flexible pipe portion 34 forming at least one loop portion. Thus the variations in relative position of two consecutive buoyant elements 8 result in a rotation of connectors 16 and/or 17 about their axes, which change the shape of the loop formed by pipe 34. This loop thus supports all the stresses resulting from these variations and can be periodically changed depending on its degree of wear.

In the embodiment illustrated by FIG. 6, connectors 16 and 17 are extended by devices 35 and 36 adapted to modify the flexibility of pipes 6m and 6n in the immediate vicinity of the connectors. These devices, which may be of any known type, comprise for example helical springs surrounding the flexible pipe. As shown by FIG. 6A, they may also comprise resilient rectilinear rods 37 having one end integral with connector 16 or 17, these rods 37 being held at the periphery of flexible pipe 6m by rings or circlips 38 so that all these rods simultaneously withstand the bending stresses applied to flexible pipe 6m.

Changes may be made without departing from the scope of the present invention. Even if it is preferred to have one buoyant element 8 at the ends of each pipe section, it is also contemplated to equip with buoyant elements only some of the pipe sections, the flexible pipe portion located between two consecutive floats being then formed of several pipe sections.

Furthermore even if it is more practical to use flexible pipes having a negative buoyancy in water it is also possible to use in some cases flexible pipes of positive buoyancy, anchoring thereof and the size of the buoyant elements being then determined in accordance with the known art and the pipe being immersed at a depth sufficient to avoid any navigation hazard.

What we claim is:

1. A device for transferring a fluid through a liquid body, the device comprising a flexible pipe formed of a plurality of pipe sections, coupling means for interconnecting the pipe sections, buoyant elements for supporting said flexible pipe immersed in use, anchoring means for maintaining the buoyant elements submerged, at least some of said coupling means being directly connected to a buoyant element, and means for limiting stresses applied to the pipe sections adjacent to said coupling means.

2. A device according to claim 1, wherein a hinged connecting element connects said coupling means to a buoyant element.

3. A device according to claim 2, wherein said hinged connecting element is a universal joint coupling.

4. A device for transferring a fluid through a liquid body, the device comprising a flexible pipe formed of pipe sections, coupling means for interconnecting the pipe sections, a plurality of buoyant elements for supporting said flexible pipe immersed in use, anchoring means for maintaining the buoyant elements submerged, at least some of said coupling means being directly connected to a buoyant element, means for limiting stresses applied to the pipe sections adjacent to said coupling means, and wherein said coupling means further comprises a support member, two connectors to which the ends of the flexible pipe portions can be secured, said connectors being interconnected through a connecting pipe.

5. A device according to claim 4, wherein said connectors are rigidly secured to said support member and inclined at a predetermined angle on the vertical line.

6. A device according to claim 5, wherein said stress limiting means comprising sleeve members for extending said connectors on the side thereof opposite said connecting pipe, said sleeve members having a bore of a determined inner profile flaring outwardly towards an end of said sleeve members opposite to said connector, this profile having at each point radius of curvature at least equal to the minimum radius of curvature of the flexible pipe.

7. A device according to claim 5, wherein said stress limiting means are formed of an element which progressively modifies the flexibility of the pipe section towards a substantially zero value at the end of the flexible pipe section.

8. A device according to claim 4, wherein hinged connections secure said connectors to said support member said hinged connections constituting said stress limiting means, and wherein said connecting pipe is flexible.

9. A device according to claim 8, wherein said connecting pipe forms at least one loop portion between said connectors.

10. A device according to one of claims 4, 5, 6, 7, 8, or 9, wherein said coupling means are connected to a buoyant element through a hinged connecting element.

11. A device according to claim 10, wherein said hinged connecting element is a universal joint coupling.

* * * * *